(No Model.)  3 Sheets—Sheet 1.

F. A. WESSEL.
ARMATURE FOR DYNAMOS OR MOTORS AND METHOD OF WINDING THE SAME.

No. 457,065.  Patented Aug. 4, 1891.

ATTEST:

INVENTOR:
Ferdinand A. Wessel
By H. C. Townsend
Attorney (No Model.) 3 Sheets—Sheet 2.
F. A. WESSEL.
ARMATURE FOR DYNAMOS OR MOTORS AND METHOD OF WINDING
THE SAME.
No. 457,065. Patented Aug. 4, 1891.
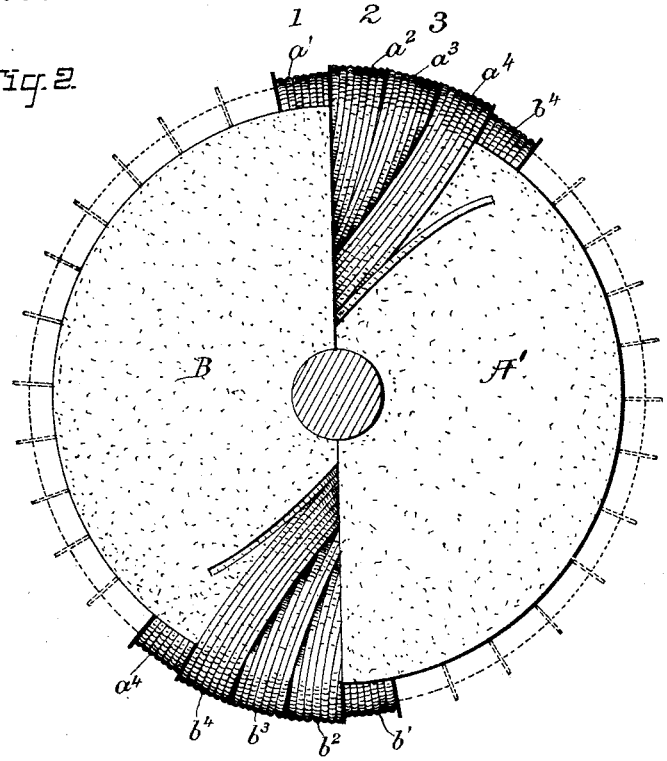
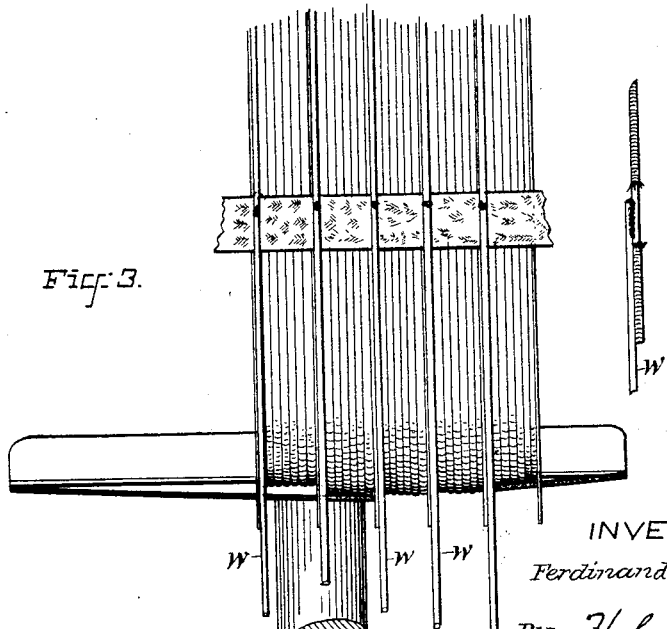
ATTEST:
INVENTOR:
Ferdinand A. Wessel
By H. C. Townsend
Attorney (No Model.)  3 Sheets—Sheet 3.

F. A. WESSEL.
ARMATURE FOR DYNAMOS OR MOTORS AND METHOD OF WINDING THE SAME.

No. 457,065. Patented Aug. 4, 1891.

ATTEST:
J. A. Hurdle
J. F. Courey

INVENTOR:
Ferdinand A. Wessel

By H. L. Townsend
Attorney

UNITED STATES PATENT OFFICE.

FERDINAND A. WESSEL, OF BROOKLYN, ASSIGNOR TO THE EXCELSIOR ELECTRIC COMPANY, OF NEW YORK, N. Y.

ARMATURE FOR DYNAMOS OR MOTORS AND METHOD OF WINDING THE SAME.

SPECIFICATION forming part of Letters Patent No. 457,065, dated August 4, 1891.

Application filed November 15, 1889. Serial No. 330,275. (No model.)

*To all whom it may concern:*

Be it known that I, FERDINAND A. WESSEL, a citizen of the United States, and a resident of Brooklyn, in the county of Kings and State of New York, have invented certain new and useful Armatures for Dynamos or Motors, of which the following is a specification.

My invention relates to the manner of winding or applying the coils on the drum-armature of a dynamo-electric machine or motor, and is particularly useful with those armatures to which two sets of coils or bobbins are applied, as in the well-known "Siemens winding," to make what is known as a "closed-circuit armature." Hitherto in winding armatures of this class it has been usual to go over the armature with one set of bobbins, leaving proper loops or ends for connection to segments of the commutator, and then to complete the winding with the other set, which is applied over the first. It is obvious that with this manner of winding connection with the inner coils or set cannot be made as conveniently as with the outer or last set. The aim of my invention is to overcome this defect or difficulty, to which end I wind the armature with the bobbins or coils of one set overlying the bobbins of the other on one side of the armature and underlying on the other, so that in effect a portion of each coil or bobbin of the two sets of windings lies on the outside or is connected directly with a portion of coil lying on the outside. Connection to the commutator-segments from every bobbin may be then made on the outside layer of the completely-wound armature. The result is obviously a saving in loose and useless wire and a facility and simplicity of connection.

In the accompanying drawings I have illustrated my invention as applied to a drum-armature having eight bobbin-spaces.

Figure 1:
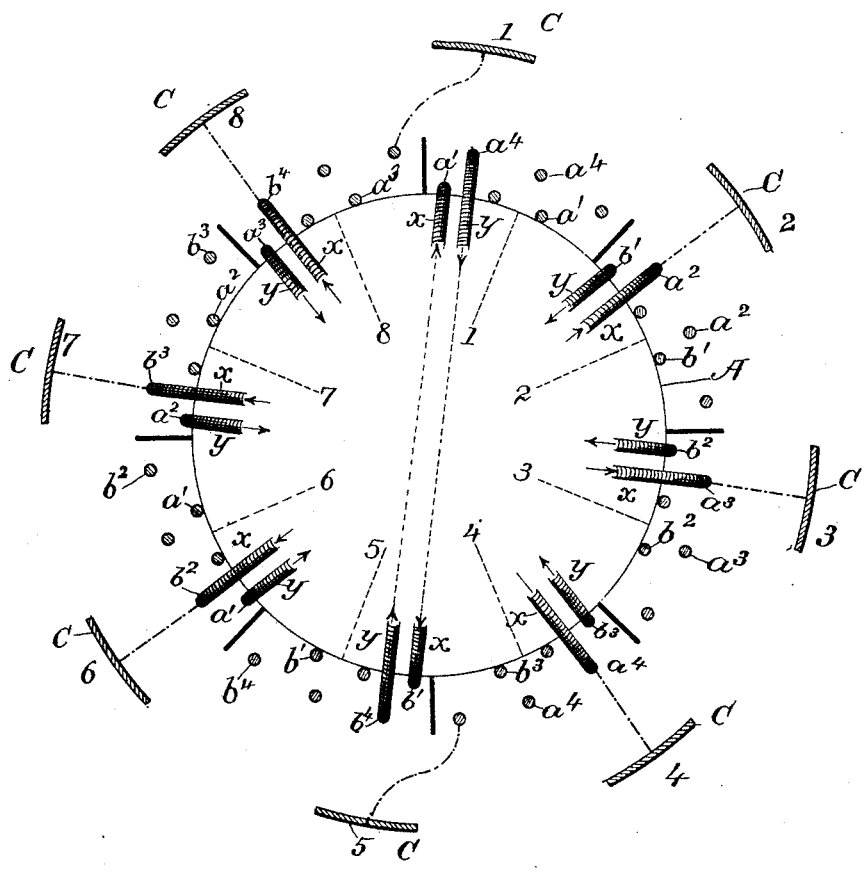
Figure 4:
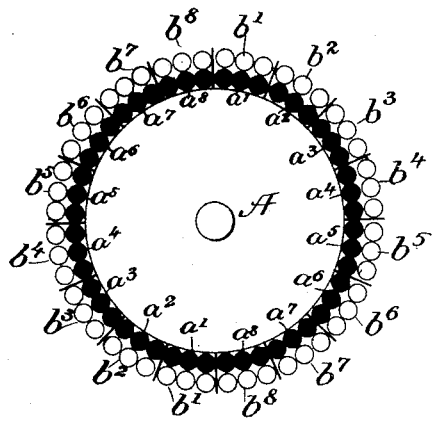
Figure 5:
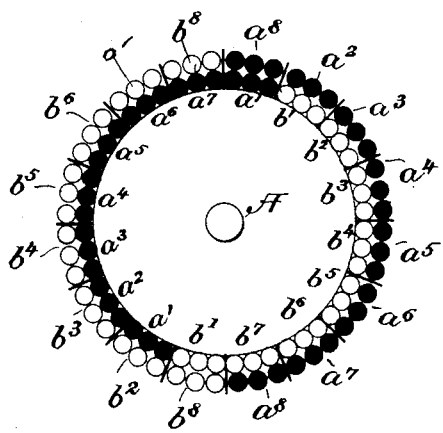

Figure 1 is a diagram illustrating my invention. Fig. 2 is an end view of an armature partly wound in accordance with my invention. Fig. 3 is a plan of a portion of the end of an armature constructed in accordance with my invention. Fig. 4 shows the relative disposition of the two sets of bobbins in the ordinary Siemens winding. Fig. 5 illustrates the relative arrangement of the two sets in my improved winding, the drawings in each case being cross-sections diametrically through the armature and the wires wound thereon.

The circular outline of the armature is indicated by the letter A in the several drawings, and the two sets of wires or bobbins are indicated one by the letters $a'$ $a^2$ $a^3$ $a^4$ $a^5$, &c., and the others by the letters $b'$ $b^2$ $b^3$ $b^4$ $b^5$, &c.

In order that my invention may be more readily understood, I will first refer to a typical way of winding an armature according to what is known as the "Siemens plan," which I have illustrated in Fig. 4. The procedure adopted in this case is to wind first the bobbin $a'$, making connection to a commutator-segment, then wind the bobbin $a^2$, and make connection between the bobbins to the next commutator-segment, proceeding in the same direction around the commutator-axis, then to wind bobbin $a^3$, and so on with the eight bobbins indicated by the letters $a'$ to $a^8$, inclusive. The result of this is to cover the armature with a layer of wire and to provide connections to the commutator-segments around one-half of the circumference of the commutator. The commutator I have omitted for the sake of simplicity and because the winding is well understood in the art. Continuing the process, the operator now winds upon the layer or layers indicated by the letters $a'$ to $a^8$, inclusive, covering the armature, the layers $b'$ to $b^8$, inclusive. The last end of the bobbin $a^8$ is connected to the first segment of the second half of the commutator and the winding of the bobbin $b'$ starts with that segment; but as the armature has been turned half round on its axis the winding of the bobbin $b'$, if the winding proceeds uniformly, will result evidently in placing the turns in an opposite direction on the armature, the effect being practically the same as if the armature should be turned round to the original position it occupied when the first bobbin $a'$ was wound, and the bobbin $b'$ should then be wound in the opposite direction to $a'$. The several bobbins $b^2$ $b^3$ $b^4$ $b^5$, &c., are wound in the same way uniformly and the connections to the remaining half of the commutator-segments made one after the other until the last end of the bobbin $b^8$ is connected to the segments with which the winding of the whole armature started—that is to say, the one to which the first end of the bobbin $a'$ is connected.

It is obvious that in winding the set $a'$ $a^2$ $a^3$, &c., which is first applied to the armature the connections to the several segments of one-half of the commutator lying on the same side of a diametrical line may be made in the process of winding or after the first layer $a'$ to $a^8$, inclusive, has been applied; but it is likewise obvious that the connections cannot be conveniently made after the set $b'$ to $b^8$, inclusive, overlying the set $a'$ to $a^8$, inclusive, has been applied, since the layers of the windings of the bobbins $a'$ to $a^8$, inclusive, lie entirely underneath those of the windings or bobbins $b'$ to $b^8$, inclusive.

The relative disposition of the two sets of windings when the armature is wound in accordance with my present invention is illustrated in Fig. 5, where I have shown a cross-section through an armature wound for sixteen commutator-segments, as is that illustrated in Fig. 4. Those windings or bobbins which are connected to the first half of the commutator-segments, or those lying on the one side of the same diametrical line, are indicated by the letters $a'$ to $a^8$, inclusive, and correspond in their connections to one another and to the commutator with the similarly-lettered windings of Fig. 4.

The bobbins which complete the winding of the armature and correspond to the bobbins $b'$ to $b^8$, Fig. 4, are indicated by the same letters in Fig. 5.

As will be seen, one portion of each bobbin $a^2$ to $a^7$ and $b^2$ to $b^7$, inclusive, forms an outside layer of the winding. The bobbins $a^8$ and $b^8$ lie on the outside of the armature on both sides thereof. So far as these bobbins are concerned there is evidently afforded a facility for making connection on the outside of the wound armature with the commutator-segments, and the connection may therefore be made after the winding has been completed. As to the bobbins $a'$ and $b'$, a similar facility is afforded for making connection at the outside of the armature, practically because in the completion of the closed-circuit winding the first end of $a'$ requires to be connected to the same commutator-segment as the last end of $b^8$, and $b^8$ is, as shown, an outside layer. In constructing the armature, therefore, all that is necessary to do is to connect the last end of the wire from which $b^8$ is wound with the first end of the wire from which $a'$ is wound, and to form the connection to the armature-segment by soldering to the outer layer of $b^8$. In the same way the bobbin $b'$ forms a continuation of the armature-winding, being connected to the last end of $a^8$, and, as well understood, is to be put in electrical connection with the same commutator-segment. As $a^8$ is an outer layer of the armature-windings, the requisite connections for $b'$ can obviously be made by soldering or connecting to the outer layer $a^8$.

It will of course be understood that, as in the case of Fig. 4, taking the armature in any given position upon its axis, the windings $a'$ to $a^8$, inclusive, will all be applied or wound in one direction, and the windings $b'$ to $b^8$, inclusive, will be wound in the opposite direction.

In order to still further elucidate my invention, I will describe the same in detail as carried out by winding an armature having two sets of bobbins $a'$ to $a^4$ and $b'$ to $b^4$, inclusive, four bobbins in each set. This, as in the ordinary Siemens closed-circuit winding, requires, obviously, eight commutator-segments in all, one half of which lie on the same side of a diametrical line and are connected in order to a set of the bobbins which are wound upon the armature in one direction, while the other half of the commutator-segments on the other half of the diametrical line are wound upon the armature in the opposite direction. The procedure as carried out in detail is described with reference to Fig. 1.

The eight several commutator segments or plates are indicated at C outside of the circumference of the armature. The arrows indicate the direction of winding and the letters $x$ $y$, respectively, the first and last ends of each bobbin or coil.

To wind the armature I proceed as follows: Starting with the bobbin $a'$, I wind the same in the spaces 1 to 6, as indicated, and then wind the first bobbin of the set $b$, as indicated at $b'$ in spaces 2 to 5, respectively, the direction of winding in this case being, however, reversed. Next I wind the bobbin or coil $a^2$ as a continuation of bobbin $a'$, applying such bobbin $a^2$ over $b'$ in the space 2 and on the opposite side of the armature, applying it in the space 7, as indicated. I then continue with the set $b$ by winding the continuation $b^2$, which is the second bobbin of the set $b$, in the spaces 6 and 3, as shown, such bobbin lying over bobbin $a'$ in space 6 and being applied directly to the armature in space 3. I then continue with the set $a$ by winding $a^3$ over $b^2$ on one side and directly in the armature on the other side, as indicated at space 3 8, after which I continue with set $b$ by winding bobbin $b^3$, as indicated, over $a^2$ on one side and directly upon the armature on the other side, as in space 4. I next finish with the set $a$ by winding coil or bobbin $a^4$ in spaces 1 and 4, as indicated, and connecting the last end of the same to the first end of the set $b$, as at $x$ $b'$. I now finish the winding of the set $b$ by winding the bobbin $b^4$ in the spaces 8 5, as shown, and connect its last end $y$ with the first end of set $a$, as indicated at $x$ $a'$. Connection to the commutator-segments may now be made by simply baring the outer layer of wire and electrically joining to the commutator-segments, as follows: The first end of $a^2$ is connected to the segment 2 of the commutator; the first end of $a^3$ to the segment 3; the first end of $a^4$ to the segment 4 by baring the wire on the first turn of said bobbins on the outer layer of the armature. Bobbin $a'$ is connected to the segment 1 by baring the last turn of wire of the outer layer of $b^4$, as indicated, on the side of the armature nearest segment 1. This wire or turn which is bared being directly connected across the end of the armature with the portion of the turn which lies on the opposite side and terminates at $y$ in space 5, which connection is made across to the beginning of $a'$, there is obviously a connection of bobbin-segment 1 of the commutator and the first end of the bobbin $a'$. Although a portion of the section $b^4$ thus becomes merged in the section $a'$, the discrepancy in the number of turns of the bobbins is not sufficient to be of any practical moment and is partly compensated for by the fact that a similar side is made in adjoining sections in forming the connection for bobbin $b'$ in the manner presently described. Continuing now the order of connections to the segments, omitting for a moment the segment 5, connection with segments 6, 7, and 8, respectively, is made with the first ends of bobbins $b^2$, $b^3$, and $b^4$ by baring the first turn of the same respectively on the outer layer of the armature in obvious manner. The connection of bobbin $b'$ of segment 5 of the commutator is made by baring the last turn of section $a^4$ on the side of the armature next segment 5, as indicated. The turn thus bared is connected across the end of the armature with the last layer of $a^4$ on the opposite side, which, terminating at $y$, connects with the beginning $x$ of bobbin $b'$. By this means there is formed a connection for bobbin $b'$ with the segment 5. A portion of bobbin $a^4$ thus becomes merged with section $b'$, a part, but an immaterial part, for practical purposes being thus removed from action. This loss in the number of turns of the sections $a^4$ $b^4$, which would take place and would produce a difference in the lengths of the sections might be made up by giving $a^4$ and $b^4$ each an extra turn.

It is obvious that my invention is applicable to an armature having any number of bobbin-spaces. The electrical connection between the segments and the outer layers of the armature may be made in any desired way without departing from my invention.

The manner of winding the armature-coils permits of the application of semicircular insulating-disks between the two sets of coils of the armature in the manner illustrated in Fig. 2. In this figure A' B are two semicircular disks or plates of insulating material, each preferably cut out at its center to embrace the shaft of the armature. In applying these sheets of insulation I proceed as follows: The first section of $a$ and the first section of $b$ are first wound, after which the half-disks of insulation A' B are applied in the position shown, with their edges meeting on the diametrical line between the sections $a'$ $b'$. Section $a^2$ is now wound upon the upper side of half-disk A', but beneath the half-disk B on the opposite side of the armature. Section $b^2$ is now wound and the lower side of A' is lifted to permit $b^2$ to be applied directly to the armature in the space 3, while the lower side of B being left in place on section $a'$ the section $b^2$ is wound upon such disk or plate B. Section $a^3$ is now wound over the disk or plate A in space 3 and under the disk B and directly upon the armature, the disk B being lifted or folded back at its free end for that purpose. This procedure is repeated no matter what the number of bobbin-spaces until the winding is completed, when it will be found that the two sets of windings are completely separated from one another by the solid or continuous sheets of insulating material A' B, which, as will be well understood, are of sufficient flexibility to permit them to be turned or folded back in the process of winding. By this method of procedure it will be seen that I completely insulate the two sets of windings by two continuous pieces only of insulating material, where hitherto it has been necessary to apply a number of separate pieces without any order or system.

I have shown in Fig. 3 in detail the manner of making the connections to the coils of the armature. In this figure the wires running from the outer layers of the coils are indicated by the letter W. These wires are straight wires of steel, soldered, as indicated, to the outer layer of the armature-wire, which is bared for that purpose. The wires W run directly to the points of attachment to the commutator-segments or bars or to the arms extending radially outward therefrom, as well understood in the art, and are there soldered or attached in any suitable manner. By the use of these bars or wires of steel for making connection I find that I am enabled to overcome a serious practical difficulty, which has arisen heretofore in the operation of dynamo-machines from the breakage of the connecting-wires leading from the segments to the coil. These connecting-wires have heretofore been made of copper, and for some reason, which has not been satisfactorily explained, frequent breakages of these wires or connections took place either from the constant vibration or from pure centrifugal action. The difficulty has been entirely overcome, as I have found by practical experiment, by substituting wires of steel between the copper wires of the armature and the copper segments of the commutator as the connecting-wires.

What I claim as my invention is—

1. The herein-described improvement in winding drum-armatures having two sets of coils or bobbins applied in two layers to the armature, consisting in winding the sets alternately and winding the bobbins of each set directly upon the armature on one side thereof and over the previously-applied portion of another bobbin of the other set upon the other side thereof, as and for the purpose described.

2. A closed-circuit drum-armature having bobbins applied in two superposed layers or sets with connections for all the commutator-segments made on the outside of the armature-winding.

3. In an armature, the combination, with the two sets of bobbins wound next the armature on one side of the same and over the wires of the other set on the opposite side of the armature, of the two half-disks of insulating material A' B, applied between the two sets in the manner and for the purpose described.

4. The combination, with the armature-coils, of the steel connecting-wires W, soldered to the outer layers of the armature-wire and extending therefrom parallel with the armature-axis for connection with the commutator segments or bars.

Signed at New York, in the county of New York and State of New York, this 29th day of October, A. D. 1889.

FERDINAND A. WESSEL.

Witnesses:
WM. H. CAPEL,
J. A. HURDLE.